Dec. 22, 1959 R. K. OLIVETTE ET AL 2,918,242
PALLET
Filed Dec. 6, 1955
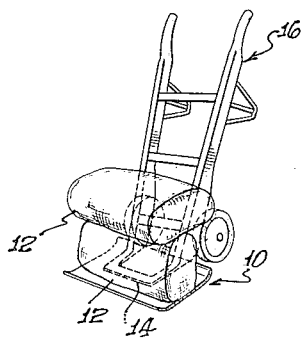
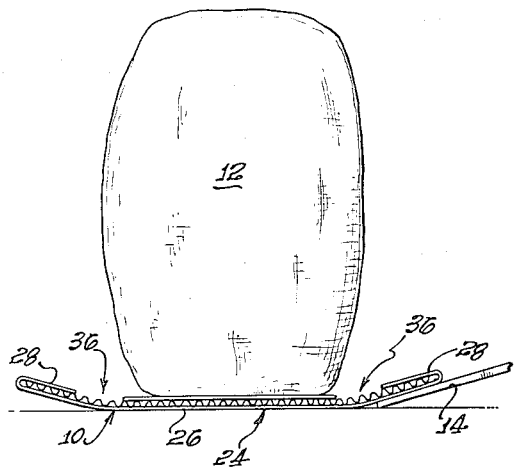
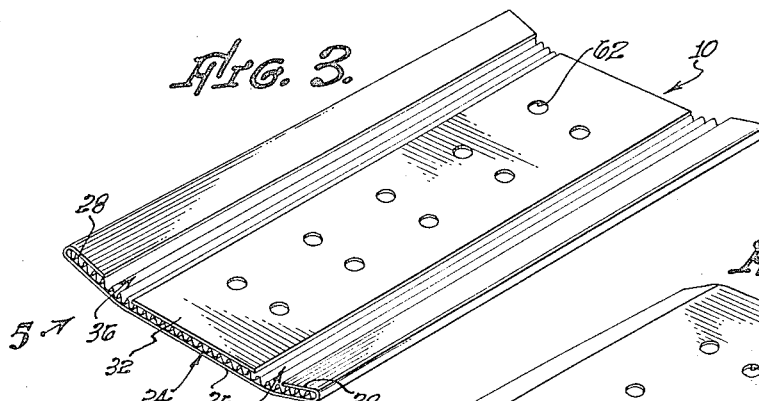
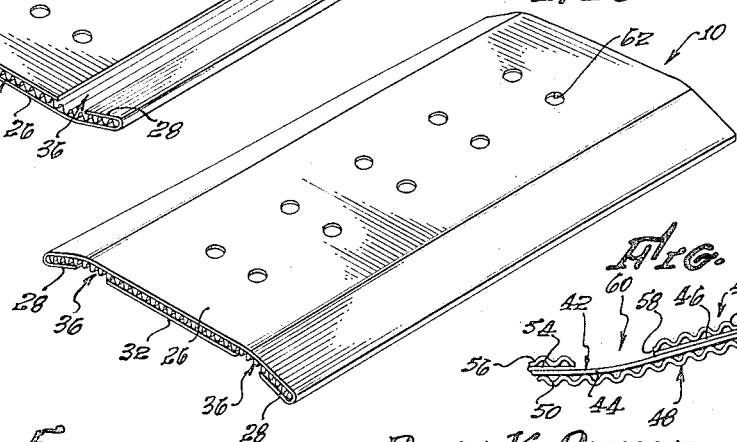
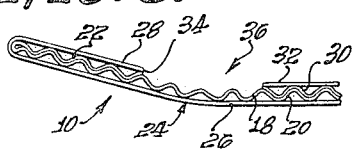
Ralph K. Olivette,
Lowell C. Gammon,
INVENTORS.
By their Attorneys.
Harris, Kiech, Foster & Harris.

United States Patent Office 2,918,242
Patented Dec. 22, 1959

2,918,242
PALLET

Ralph K. Olivette, Bakersfield, and Lowell C. Gammon, La Habra, Calif.

Application December 6, 1955, Serial No. 551,331

3 Claims. (Cl. 248—120)

The present invention relates in general to a pallet and, more particularly, to a pallet intended primarily for use with sacked goods, such as potatoes, for example, although it will be understood that the invention is not limited thereto.

It is conventional practice to utilize as a pallet for sacked goods a flat pad of ordinary cardboard having one or more corrugated layers, such a simple pallet providing adequate protection for the goods when resting on a floor, or the like. However, it is difficult to insert the blade of a hand truck, or other equipment for transporting the sacked goods, under such a pallet because of the fact that it lies flat on the floor. With such a flat pallet, considerable effort is frequently necessary to insert the blade of a hand truck under the pallet, and it is not uncommon for the operator of the hand truck to have to exert considerable force in attempting to insert the blade under the pallet. Such treatment frequently results not only in damage to the pallet itself, but in damage to the sacked goods stacked on the pallet, which is a much more serious matter. The foregoing problem is particularly severe with goods which are easily bruised or otherwise damaged.

In view of the foregoing, a primary object of the invention is to provide a pallet which has the form of a pad of cardboard, or the like, but which is provided with one or more edges tending to curl upwardly so that the blade of a hand truck, or other lifting equipment, may be inserted under the pad easily without the exertion of sufficient force to damage either the pad or the goods stacked thereon.

More particularly, an important object of the invention is to provide a pallet of laminated paper, or the like, having its upper surface weakened in at least one zone extending along and spaced inwardly from an edge of the pallet. This weakened zone tends to cause the pallet to curl upwardly between the weakened zone and the adjacent edge of the pallet to permit easy insertion of the blade of a hand truck, or the like, which is an important feature of the invention.

Another object is to provide a pallet comprising a laminated structure having at least two layers at least one of which is corrugated longitudinally of the structure, the uppermost of the layers having gaps therein in zones parallel to and spaced inwardly from the longitudinal edges of the structure to weaken the structure in such zones, whereby the laminated structure tends to curl upwardly between the weakened zones and the edges thereof for easy insertion of a lifting means under the pallet.

Another object is to provide a laminated pallet of paper or the like, which includes two lower sheets the edges of which are folded upwardly and inwardly upon themselves, and which includes two upper sheets superimposed on and secured to the lower sheets and spaced inwardly from the upwardly and inwardly folded edges of the lower sheets, one of the lower sheets and one of the upper sheets being longitudinally corrugated. With this construction, two gaps, extending along and spaced inwardly from the edges of the pallet, are provided in the upper surface thereof, whereby the edges of the pallet curl upwardly for easy insertion of a lifting device thereunder.

The foregoing objects, advantages, features and results of the present invention, together with various other objects, advantages, features and results thereof which will be apparent to those skilled in the art in the light of this disclosure, may be attained with the exemplary embodiments of the invention illustrated in the accompanying drawing and described in detail hereinafter. Referring to the drawing:

Fig. 1 is a perspective view on a reduced scale showing a stack of sacked goods on a pallet of the invention under which the blade of a hand truck has been inserted;

Fig. 2 is an end elevational view of a sack on a pallet of the invention under which the blade of a hand truck is being inserted;

Fig. 3 is a perspective view showing the upper surface of a pallet of the invention;

Fig. 4 is a perspective view showing the lower surface thereof;

Fig. 5 is an enlarged, fragmentary, end elevation of a pallet of the invention taken as indicated by the arrow 5 of Fig. 3; and Fig. 6 is a view similar to Fig. 5, but illustrating an alternative embodiment of the invention.

Referring to Fig. 1 of the drawing, the numeral 10 designates a pallet of the invention on which sacks 12 are stacked and under which the blade 14 of a hand truck 16 has been inserted. In Fig. 2 of the drawing, the actual insertion of the blade 14 under the pallet 10 is illustrated.

Referring particularly to Figs. 3 to 5 of the drawing, the pallet 10 includes an integral first inner sheet 18 of longitudinally corrugated paper, or the like, having a lower portion 20 and inwardly folded upper portions 22 superimposed on and secured to the lower portion 20 along its edges. An integral first outer sheet 24 substantially completely encloses and is substantially co-extensive with the first inner sheet 18, the sheet 24, which is uncorrugated, including a lower portion 26 below and secured to the lower portion 20 of the first inner sheet 18, and including inwardly folded upper portions 28 respectively superimposed on and secured to the upper portions 22 of the first inner sheet 18. A second inner sheet 30, which is also longitudinally corrugated, is superimposed on and secured to the central portion of the lower portion 20 of the first inner sheet 18 and is spaced inwardly from the upper portions 22 and 28 of the first inner and outer sheets 18 and 24. An uncorrugated second outer sheet 32 is superimposed on and is secured to the second inner sheet 30, the second outer sheet being substantially co-extensive with the second inner sheet.

The foregoing construction in effect results in a four-layer laminated structure having uncorrugated upper and lower layers and corrugated intermediate layers, and having gaps 34 which are spaced inwardly from the edges of the laminated structure and which extend through the two uppermost layers thereof. Thus, the pallet 10 is provided with weakened zones 36 which, with the construction described, cause the edges of the pallet to curl upwardly as illustrated. Such upward curling of the edges of the pallet 10 provides for easy insertion of the blade 14 of the hand truck 16 under the pallet, thereby preventing damage both to the pallet and to the goods in the sacks 12 stacked thereon.

While the pallet 10 illustrated in Figs. 1 to 5 of the drawing represents the presently preferred embodiment of the invention, Fig. 6 of the drawing illustrates, fragmentarily, a pallet 40 representing an alternative embodiment. In the pallet 40, there is an integral first inner sheet 42 which includes a lower portion 44 and inwardly folded upper portions 46 superimposed on and secured to the lower portion 44 along its edges. The pallet 40 also includes an integral first outer sheet 48 substantially completely enclosing and substantially co-extensive with the first inner sheet 42, the first outer sheet 48 including a lower portion 50 below and secured to the lower portion 44 of the first inner sheet, and including inwardly folded upper portions 52 respectively superimposed on and secured to the upper portions 46 of the first inner sheet. The pallet 40 further includes a second inner sheet 54 superimposed on and secured to the lower portion 44 of the first inner sheet 42 and spaced inwardly from the upper portions 46 and 52 of the first inner and outer sheets 42 and 48. A second outer sheet 56 is superimposed on and secured to the second inner sheet 54, the sheets 54 and 56 being substantially co-extensive. The only difference between the pallet 40 and the pallet 10 is that, in the pallet 40, the inner sheets 42 and 54 are uncorrugated and the outer sheets 48 and 56 are longitudinally corrugated. In the pallet 10, the inner sheets 18 and 30 are corrugated, and the outer sheets 24 and 32 are uncorrugated.

The pallet 40 is also provided with gaps 58 in its upper surface which result in weakened zones 60 causing the edges of the pallet 40 to curl upwardly in the same manner as the edges of the pallet 10.

In both the pallets 10 and 40, the respective sheets constituting same may be secured together in any suitable manner, as by gluing, cementing, or the like. Preferably, ventilating holes are provided through the central portions of the pallets, as exemplified by the ventilating holes 62 through the central portion of the pallet 10.

Although we have disclosed exemplary embodiments of our invention herein for illustrative purposes, it will be understood that various changes, modifications, and substitutions may be incorporated in such embodiments without departing from the spirit of the invention as defined by the claims hereinafter appearing.

We claim as our invention:

1. In a laminated pallet, the combination of: an integral first inner sheet including a lower portion and inwardly folder upper portions superimposed on and secured to said lower portion thereof along its edges; an integral first outer sheet substantially co-extensive with said first inner sheet, said first outer sheet including a lower portion below and secured to said lower portion of said first inner sheet, and including inwardly folded upper portions respectively superimposed on and secured to said upper portions of said first inner sheet; a second inner sheet superimposed on and secured to said lower portion of said first inner sheet and spaced inwardly from said upper portions of said first inner and outer sheets; and a second outer sheet superimposed on and secured to and substantially co-extensive with said second inner sheet, one of said first sheets and one of said second sheets being corrugated longitudinally of said pallet, said pallet curling upwardly in gradual curves of large radii in zones between said second inner and outer sheets and said upper portions of said first inner and outer sheets.

2. A laminated pallet as defined in claim 1 wherein said first and second inner sheets are corrugated longitudinally of said pallet.

3. A laminated pallet according to claim 1 wherein said first and second outer sheets are corrugated longitudinally of said pallet.

References Cited in the file of this patent

UNITED STATES PATENTS

| | | |
|---|---|---|
| 641,207 | Higham | Jan. 9, 1900 |
| 1,965,951 | Williams | July 10, 1934 |
| 2,012,131 | Kondolf | Aug. 20, 1935 |
| 2,328,397 | Nuemann | Aug. 31, 1943 |
| 2,506,346 | Crawford | May 2, 1950 |

FOREIGN PATENTS

| | | |
|---|---|---|
| 107,817 | Sweden | June 29, 1943 |
| 407,495 | Great Britain | Mar. 22, 1934 |